United States Patent Office 3,716,280
Patented Feb. 13, 1973

3,716,280
BEARING CONSTRUCTION WITH PRELOAD
COMPENSATION
Robert Lee Leibensperger and Glen Ray Norris, Canton,
Ohio, assignors to The Timken Company, Canton, Ohio
Filed Dec. 20, 1971, Ser. No. 210,042
Int. Cl. F16c 35/06
U.S. Cl. 308—207 A                13 Claims

ABSTRACT OF THE DISCLOSURE

A bearing for supporting a rotatable spindle in a housing includes a cone encircling the spindle, a cup in the housing, and a plurality of tapered rollers positioned between and engaged with the cup and cone. A floating rib ring bears against the large diameter end faces of the rollers adjacent to the cup, and this rib ring is housed in a rib ring carrier. Connected with the carrier is rib positioning means for maintaining a substantially constant force on the rib ring so that the preload of the bearing does not vary from a selected set point as the bearing and the surrounding structure experienced differential thermal expansion. The positioning means may be adjusted to another set point while the spindle is rotating, in which case it imparts another substantially constant force to the rib ring and that force corresponds to the new set point.

BACKGROUND OF THE INVENTION

This invention relates in general to tapered roller bearings, and more particularly to tapered roller bearings which are ideally suited for use in precision machinery such as machine tools.

Since tapered roller bearings carry axial loading as well as radial loading and when employed in pairs may be adjusted against one another to control both end and radial play, these bearings have experienced wide-spread use in the machine tool industry where great precision is demanded. Tapered roller bearings are particularly desirable for use as the journals for machine tool spindles where it is important to maintain proper bearing adjustment and to obtain maximum spindle rigidity. Heretofore, the tapered roller bearings for machine tool spindles have been adjusted by threaded devices or through the use of incremental shimming behind the bearings. Neither the threaded devices nor the shimming enable bearings to be adjusted while the machine tool is in operation, but on the contrary, usually require disassembly of the spindle housing to effect the adjustment. Accordingly, the bearing adjustment for conventional spindles is predetermined or in other words is set at the time of assembly such that proper adjustment exists when the spindle operates. In most machines the adjustment is such that the spindle bearings operate under preload conditions, for when the bearings are preloaded, the accuracy is best, that is the deviation of the spindle nose from a perfect circle is minimal, and furthermore the dynamic and static stiffness are also best.

The inability to adjust the tapered roller bearings of machine tools during operation creates significant problems. In the first place, it provides no compensation for differential expansion. For example, during start-up the heat generated in the bearings is confined primarily to the bearings, and this may expand the bearings and place them under an excessive axial preload, in which case the bearings may fail. Furthermore, the heat transfer characteristics of the bearing housing and the spindle shaft are different so that the bearing components in contact with them operate at different temperatures. In this regard, it should be realized that machine tool bearings are operated with no end play or even preload, which means thermal expansion may bring the bearings into a preload condition which exceeds the capacity of the bearing. On the other hand, when the heat dissipates into the housing which carries the bearings and also into the spindle shaft which the bearings support, the resulting bearing adjustment may not be optimum. The foregoing differential expansion occurs as the result of incremental changes in speed also and indeed is quite serious where the incremental changes are relatively great.

Moreover, since the bearings do not operate at the same temperature for all speeds, no single adjustment is ideal for all speeds. Thus, while a particular adjustment of the bearings may result in exactly zero clearance or a desired preload at 200 r.p.m., the same adjustment may cause excessive preload at 7000 r.p.m. where the bearing runs much hotter.

It has been observed that the resonant frequency of a machine tool spindle is a function of the spindle rigidity. Should a cutting operation generate a forced or self-excited vibration at or near the resonant frequency of the spindle, clearly it would be desirable to alter the spindle rigidity to avoid excessive movement of the spindle nose. This can be achieved by changing the preload of the spindle bearings, but conventional spindle bearings offer no means for easily changing the preload.

SUMMARY OF THE INVENTION

One of the principal objects of the present invention is to provide a tapered roller bearing construction which may be maintained under a constant preload even when differential expansion between the bearing and its supporting structure occurs. Another object is to provide a bearing construction of the type stated in which the bearing adjustment may be altered while the bearing operates. A further object is to provide a bearing construction of the type stated which affords improved static and dynamic stiffness characteristics for the shaft supported thereby. Still another object is to provide a bearing construction of the type stated which provides control over and enables adjustment of the resonant frequency for the supported shaft. Yet another object is to provide a bearing construction which is ideally suited for machine tools. These and other objects and advantages will become apparent hereinafter.

The present invention is embodied in a bearing construction of the tapered roller variety. The bearing has a floating rib which axially positions the rollers between the cup and cone and rib positioning means for maintaining a substantially constant force on the rib. That force corresponds to a predetermined set point, and the rib positioning means is adjustable while the bearing operates for changing the substantially constant force to correspond to another selected set point. The invention also consists in the parts and in the arrangements and combinations of parts hereinafter described and claimed.

DESCRIPTION OF THE DRAWINGS

In the accompanying drawings which form part of the specification and wherein like numerals refer to like parts wherever they occur.

DETAILED DESCRIPTION

Figure 1:
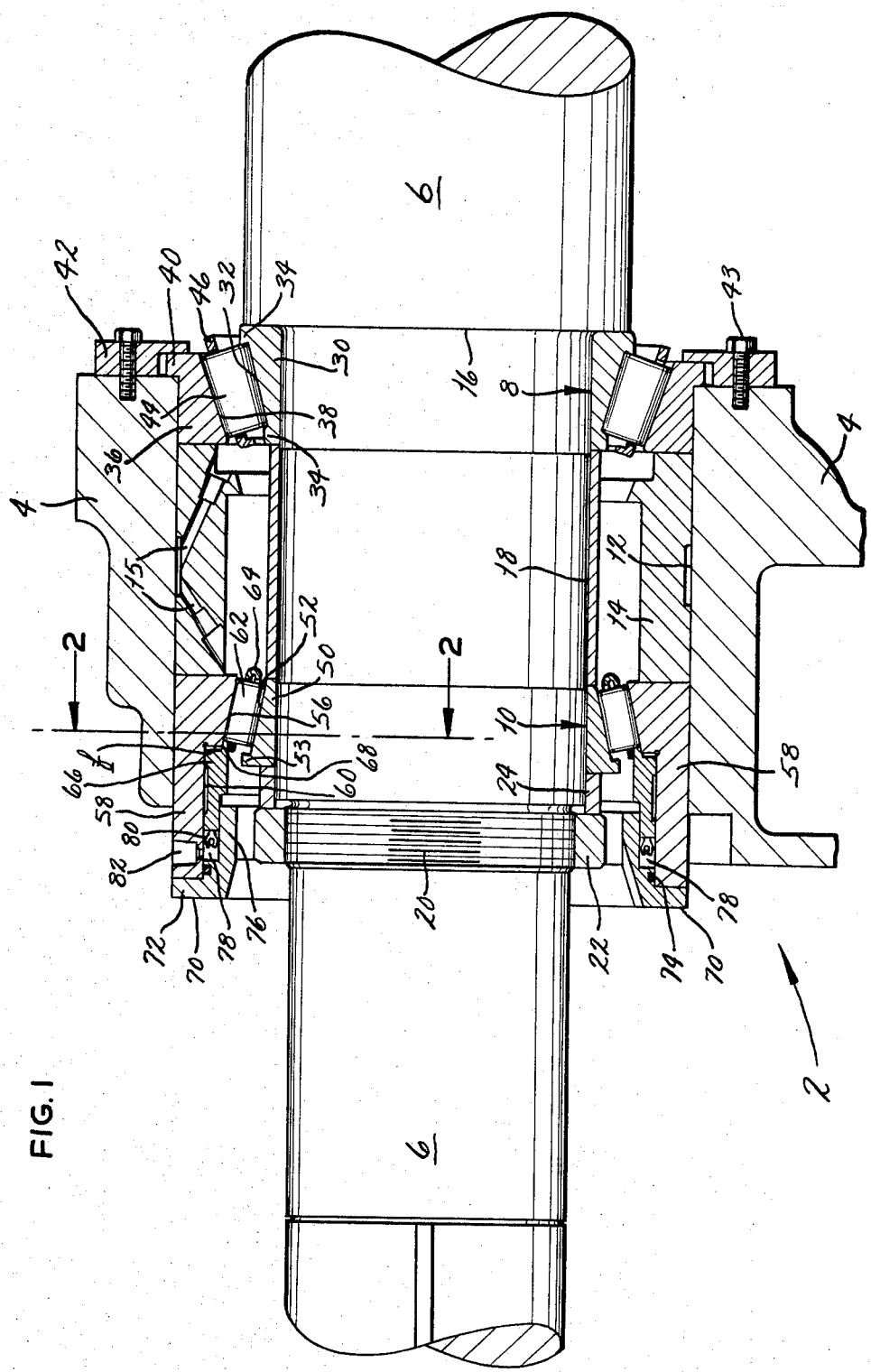
FIG. 1 is a sectional view of a bearing construction constructed in accordance with and embodying the present invention.

Referring now to the drawings, 2 designates the headstock of a precision tool such as lathe or boring machine. The headstock 2 includes (FIG. 1) a housing 4, a spindle 6 which extends through and rotates within the housing 4, and a pair of tapered roller bearing assemblies 8 and 10 which support the spindle 6 in the housing 4 and enable it to rotate freely therein under selected preload, irrespective of the spindle speed or the temperature differentials within the headstock 2.

The housing 4 is provided with a bore 12 and the bearing 8 is positioned in one end of this bore while the bearing 10 is positioned in the opposite end thereof. The bore 12 also contains a sleeve-like spacer 14 which is disposed between the two bearings 8 and 10, and the upper portion of that spacer is provided with a pair of lubrication channels 15 which lead to and are directed at bearings 8 and 10 for discharging a liquid lubricant into them.

The spindle 6 extends through the bore 12 in the housing 4 and at the outwardly presented end of the bearing 8 it is provided with a shoulder 16. Between the two bearings 8 and 10 the spindle 6 extends through an inner spacer 18 which is encircled by the outer spacer 14. Finally, beyond the opposite bearing 10 the spindle has threads 20 which are engaged by a nut 22, and the nut 22 forces a short collar 24 against the bearing 10. Thus, the collar 24, the bearing 10, the inner spacer 18, and the bearing 8 are all clamped in that order between the nut 22 and the shoulder 16.

The bearing 8 is conventional in design and includes the usual cone 30 which encircles the spindle 6 and is clamped between the shoulder 16 and the spacer 18. The cone 30 has an outwardly presented tapered raceway 32 and ribs 34 at each end of the raceway 32. In addition, the bearing 8 includes a cup 36 which fits into the housing bore 12 and has an inwardly presented tapered raceway 38 located opposite to the cone raceway 32. The cup 36 is also provided with an integral flange 40 which projects outwardly along the end face of the housing 4 and is clamped in place by a retaining ring 42 fastened against the housing 4 by bolts 43. Completing the bearing 8 are tapered rollers 44 which engage and roll along the raceways 32 and 38 and a cage 46 for maintaining the proper spacing between the rollers 44. The cage 46 in cooperation with the ribs 34 holds the rollers on the cone 30 when the bearing 8 is disassembled, while the rib 34 at the large diameter end of the raceway 32 axially positions the rollers 44 within the bearing 8 and resists the forces tend to expel them.

The other tapered roller bearing 10 differs considerably from the conventional tapered roller bearing construction. That bearing includes a cone 50 fitted around the spindle 6 and clamped in position between the inner spacer 18 and the collar 24. The cone 50 has an outwardly presented tapered raceway 52 and a rib 53 at the large diameter end of that raceway. The rib 53 exists solely for the purpose of removing the tightly fitted cone 50 from the shaft 6 during disassembly, and hence differs from the larger of the two cone ribs 34 on the other bearing 8 which locates the tapered rollers 44. The bearing 10 also includes a cup 54 which fits into the housing bore 12 with its back face bearing against the outer spacer 14 and its front face $f$ presented outwardly. Thus, the outer spacer 14 maintains a predetermined and fixed distance between the cups 36 and 54 of the two bearings 8 and 10, while the inner spacer 18 maintains a predetermined and fixed spacing between the cones 30 and 50 of those bearings. The cup 54 has an inwardly presented tapered raceway 56 located opposite to the cone raceway 52, and extending axially beyond the raceway 56 a considerable distance is a rib ring carrier 58. Indeed, rib ring carrier 58 is an integral part of the cup 54 and has a bore 60 which is ground cylindrical and is greater in diameter than the large diameter end of the raceway 56. Aside from the cone 50 and the cup 54, the bearing 10 also includes tapered rollers 62 which engage and roll along the raceways 52 and 56 of the cone 50 and cup 54, as well as a cage 64 which retains the rollers 62 as an assembly and maintains the proper spacing between them. The rollers 62 do not engage the rib 53 on the cone 50.

Figure 2:
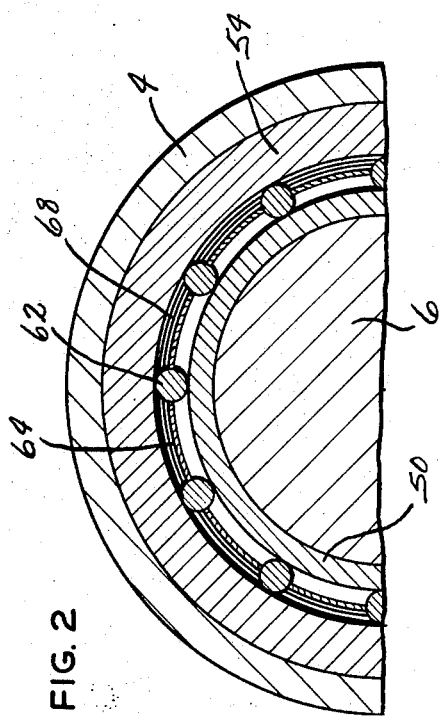
FIG. 2 is a sectional view taken along lines 2—2 of FIG. 1.

Completing the bearing 10 is a cup ring 66 which fits into the bore 60 of the cup 54 and has an annular rib 68 (FIGS. 1 and 2) of reduced diameter at its inner end to enable it to project inwardly beyond the large diameter end of the cup raceway 54. The rib 68 bears against the large diameter end faces of the rollers 62 and axially positions those rollers between the opposed raceways 52 and 56. Consequently, the magnitude of preload in the bearings 8 and 10 is dependent on the axial position of the rib ring 66. Clearance exists between the rib ring 66 and the bore 60 of its carrier 58 to enable the former to shift freely within the latter in the axial direction. The rib ring 66 may be formed from steel or ceramics.

Fitted to the rib ring carrier 58 is a carrier closure 70, having a flange 72 which extends across and is bolted to the end face of the rib ring carrier 58. Inwardly, from the flange 72, the closure 70 carries an O-ring seal 74 which engages the bore 60 and forms a fluid tight seal therewith. Beyond the seal 74, the closure 70 possesses a reduced section 76 having an outside surface which is ground cylindrical and is spaced inwardly from the ground cylindrical surface of the bore 60 so as to form an annular cavity 78 with the carrier 58. The reduced section 76 projects inwardly beyond the rear end of the rib ring 66, or in other words, the rear end of the rib ring 66 projects into the cavity 78. Again, the clearance exists between the reduced section 76 of the closure 70 and the overlapping portion of the rib ring 66 to enable the end of the rib ring 66 to shift freely in the cavity 78. The cavity 78 contains a double lip floating-type seal 80 which is molded from an elastomer and bears against the end face of the rib ring 66. The lips of the floating seal 80 diverge rearwardly and engage the ground cylindrical surfaces of the carrier bore 60 and the reduced section 76 of the carrier closure 70, forming a fluid tight seal therewith. The cavity 78 is supplied with oil through a port 82 in the rear end of the rib ring carrier 58.

To achieve true rolling motion within the bearing 10, it is important that the rollers 62 of bearing 10 run on the same apices as that of raceway 52 of cone 50 and raceway 56 of cup 54. This is obtained by providing a dummy spacer (for setup purposes only) between rib ring 66 and the cup front face $f$ of cup 54. When the rib ring 66 is clamped up through the dummy spacer and the cup front face $f$ of cup 54, the rollers 62 are on apex with raceways 52 and 56. The front face stand of bearing 10 is then determined. The stand of bearing 8 is also measured and used to determine the relative length of outer spacer 14 and inner spacer 18 for proper assembly.

An alternate approach is to eliminate inner spacer 18 and the need for the dummy spacer. The rib ring 66 is then designed so that when its face abuts with the cup front face $f$ of cup 54, the apices of rollers 62 and raceway 52 and 56 are identical. At assembly, the cavity 78 is pressurized to insure contact between the face of rib ring 66 and front face $f$ of the cup 54. The bearings 8 and 10 are then adjusted through the nut 22 to give a prescribed preload which causes rib ring 66 to move back into cavity 78. The nut 22 is then fixed to the spindle 6 by an appropriate locking device. Further bearing preload is then controlled by varying the positioning force applied to the rib ring 66.

Figure 3:
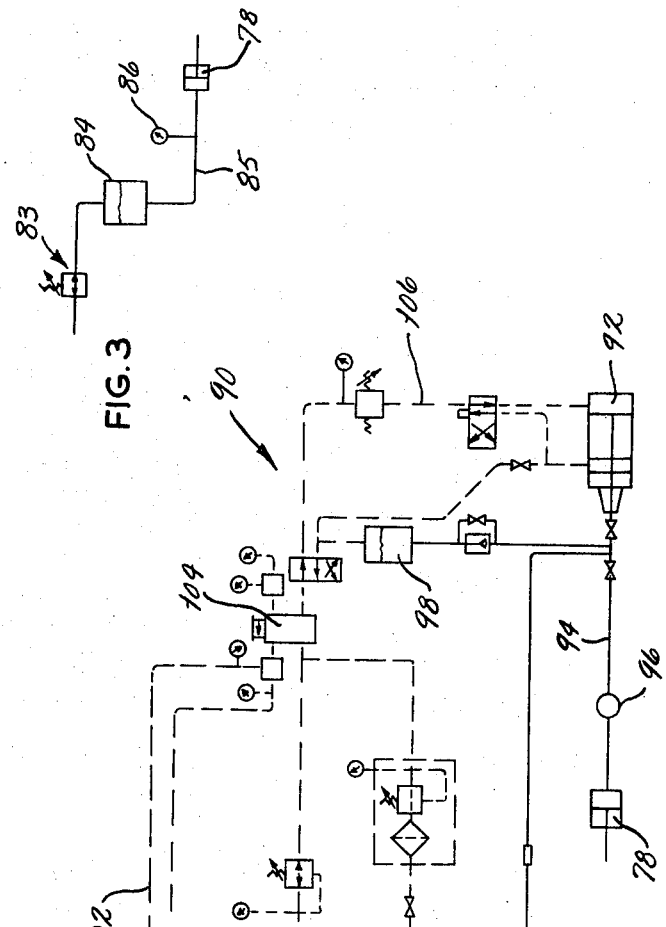
FIG. 3 is a partial schematic view of a hydraulic loading and control system suitable for use with the present invention.

The port 82 of the rib ring carrier 58 is connected with a hydraulic loading and control system which maintains the oil in the annular cavity 78 under pressure so as to control the position the rib ring 66 and hence the preload in the bearings 8 and 10. Various means for maintaining and controlling the pressure in the annular cavity 78 can be used. For most machine tool applications, adequate maximum required bearing preload can be obtained with a shop air supply of 60 p.s.i.g. (FIG. 3). The shop air is regulated to a desired preload setting or set point with a simple self-relieving air pressure regulator 83, to which a pressurized air-oil tank 84 is connected. An air-oil interface exists within the tank 84, and the lower or oil side of the tank 84 is connected with the cavity 78 through an oil line 85. The use of oil between the self-relieving air pressure regulator 83 and the annular cavity avoids corrosion problems in the annular cavity 78. Installed in the oil line 85 between the pressurized air-oil tank 84 and the annular cavity 78 is a pressure gauge 86 which reads the oil line pressure. The pressure gauge 86 may be calibrated to read directly in spindle preload (lbs.).

If bearing preloads greater than those which can be obtained with available shop air pressure are required, then an air-oil booster system 90 (FIG. 4) should be used. The system 90 includes an air-oil booster 92, the oil side of which is connected to the port 82 of the rib ring carrier 58 through an oil line 94, and that line 94 contains a pressure transducer 96 which is calibrated in terms of spindle preload to monitor the system 90. The oil line 94 is further connected with a reservoir 98 and also with a pressure transmitter 100, the latter of which senses the oil pressure within the line 94 and supplies a pneumatic signal which is proportional to the measured pressure. Actually, the signal constitutes a variance in air pressure within an air line 102 leading to a pressure controller 104. Thus, the transmitter 100 detects changes in oil pressure and converts those changes to proportional changes in air pressure. Normally, two transmitters 100 are employed, one for relatively low oil pressures and the other for higher pressures.

The pressure controller 104 is further connected with the air side of the air-oil booster 92 through another air line 106. The pressure controller 104 possesses a control knob at which the set point pressure for the hydraulic line 94 is manually set, and that pressure corresponds to a selected set point preload for the bearings 8 and 10. Once the dial is so positioned, the controller 104 compares the pressure in the air line 102 with the setting or set point dialed into that device, and varies the air pressure in the line 106 leading to the air-oil booster 92 such that the air-oil booster 92 brings the oil pressure in the oil line 94 back to the set oil value should it deviate therefrom. This maintains a substantially constant oil pressure in the oil line 94 and cavity 78. Thus, if the pressure within the oil line 94 drops, one of the transmitters 100 senses the decrease in pressure and transmits this change in oil pressure to the controller 104 as a reduced pressure in the air line 102. The controller 104 in turn compensates for this reduction in pressure by increasing the air pressure in the line 106, and this of course increases the air pressure at the air side of the air-oil booster 92 which in turn increases the oil pressure in the air-oil booster 92 to bring the oil pressure back to its set point. Just the opposite occurs when the oil pressure rises above the set point.

However, if the machine tool containing the bearings 8 and 10 also contains a hydraulic pump system with sufficient pressure capabilities, it may be advantageous to use this system to pressurize the annular cavity 78. To regulate such a system would require the installation of a pressure reducing valve between the pump and the annular cavity 78. In some machine tools having their own hydraulic pump system, the spindle bearings are disposed within an oil reservoir. If the bearing 10 were so disposed, the double lip floating-type seal 80 may be eliminated since leakage between the close clearance of the rib ring carrier 58 and the reduced section 76 of the carrier closure 70, on one hand, and the rib ring 66, on the other, would be negligible. The elimination of the double lip floating-type seal 80 would reduce frictional drag and improve the system response.

OPERATION

The operation of the bearing 10 will be described in conjunction with the air-oil booster system 90 only, since an understanding of that system enables one to understand the others also.

A tool or work piece is connected with the spindle nose, that is the end of the spindle 6 located beyond the bearing 10, by means of a chuck or some other connecting device. Thereafter, the dial on the pressure controller 104 is manually adjusted to a selected set point which is suitable for the machining operation, and that set point corresponds to a specific oil pressure within the cavity 78. That oil pressure is derived through the air-oil booster 92 and of course causes the axially directed force on the cup rib ring 66, which force urges the rib ring 66 toward the tapered rollers 62. Indeed, the annular rib 68 on the rib ring 66 bears against the large diameter end faces of the rollers 62 and forces those rollers 62 against the tapered raceways 52 and 56 of the cone 50 and the cup 54. The presence of the rib 68 adjacent to the cup raceway 56 determines the axial position of the rollers 62 in the bearing 10, and the force applied to those rollers by the pressurized oil acting upon the rib ring 66 in effect preloads the bearings 8 and 10. The force of course should not exceed the bearing preload capacity.

Once the pressure controller 104 is set at the prescribed pressure, the spindle 6 is energized and brought to the speed selected for the machining operation. The bearings 8 and 10 of course generate heat, and this heat is initially confined to the bearings 8 and 10 themselves, creating differential expansion therein. In particular, the cones 30 and 50 and rollers 44 and 62 of the bearings 8 and 10 enlarge proportionally much more than the cups 36 and 54 which are confined by the unheated housing 4. This expansion may be attributed to the generation of the elastohydrodynamic oil film and the shearing action within this film at the roller-raceway contacts. Consequently, the rollers 62 of the bearing 10 force the cup rib ring 66 further into the annular cavity 78, but since the pressure of the oil in the annular cavity 78 and line 94 remains constant at the set point to which the controller 104 is adjusted, the preload on the bearing 10 does not alter and clearly does not become excessive.

After a sustained period of operation the heat from the bearings 8 and 10 dissipates into the spindle 6 and housing 4 and those components also expand, and the expansion of the housing 4 allows the cups 36 and 54 to expand. This frees the rollers 62 to move further into the bearing 10, and the rib ring 66 follows the rollers 62 into the bearing, maintaining the same force on them. Thus, the preload on the bearing 10 does not change once the headstock 2 reaches its normal operating temperature. Indeed, the preload remains constant even while other operating parameters such as speed vary considerably.

The set point pressure may be changed during the operation of the machine tool merely by dialing a different set point pressure into the system 90 at the controller 104. For example, if the machining operation induces a frequency close to the resonant frequency of the spindle 6, the resonant frequency of the spindle 6 may be altered by changing the preload in the bearings 8 and 10. In this regard, it will be recalled that the resonant or natural frequency of the spindle 6 is a function of its rigidity, and the rigidity is dependent upon the preload applied at the bearing 10. Thus, the excessive spindle nose movement associated with machining operations near the resonant frequency may be reduced with the present invention.

The preload may also be altered during operation to keep the temperature or frictional torque within safe limits.

Moreover, the presence of the bearing 10 and its hydraulic preloading system results in improved static and dynamic stiffness for the spindle 6 when compared with spring compensated systems operating at the same preload. Part of the improved dynamic characteristics may result from the damping action of the oil in the cavity 78 behind the rib ring 66.

In short, the bearing 10 coupled with its hydraulic loading and control system enables the spindle 6 to run at higher speeds, improves accuracy, enhances the dynamic and static stiffness characteristics of the spindle 6, and offers increased flexibility in controlling spindle performance characteristics. This results in improved cutting accuracy of the spindle 6 over a wide range of speeds.

Figure 4:
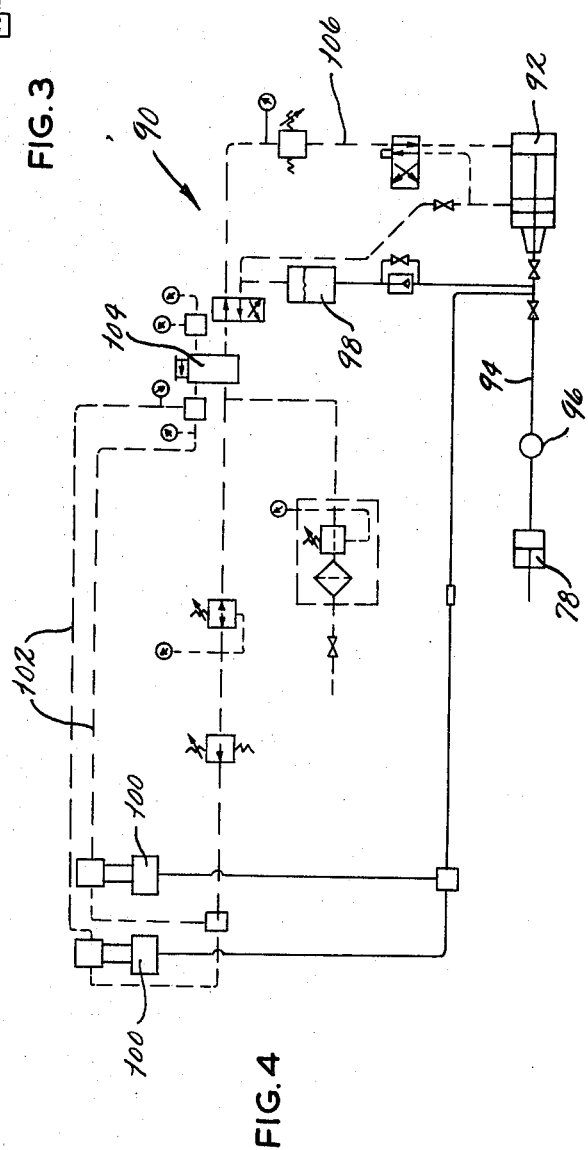
FIG. 4 is a schematic view of a hydraulic loading and control system also suitable for use with the present invention and being of the air-oil booster variety.
Figure 6:
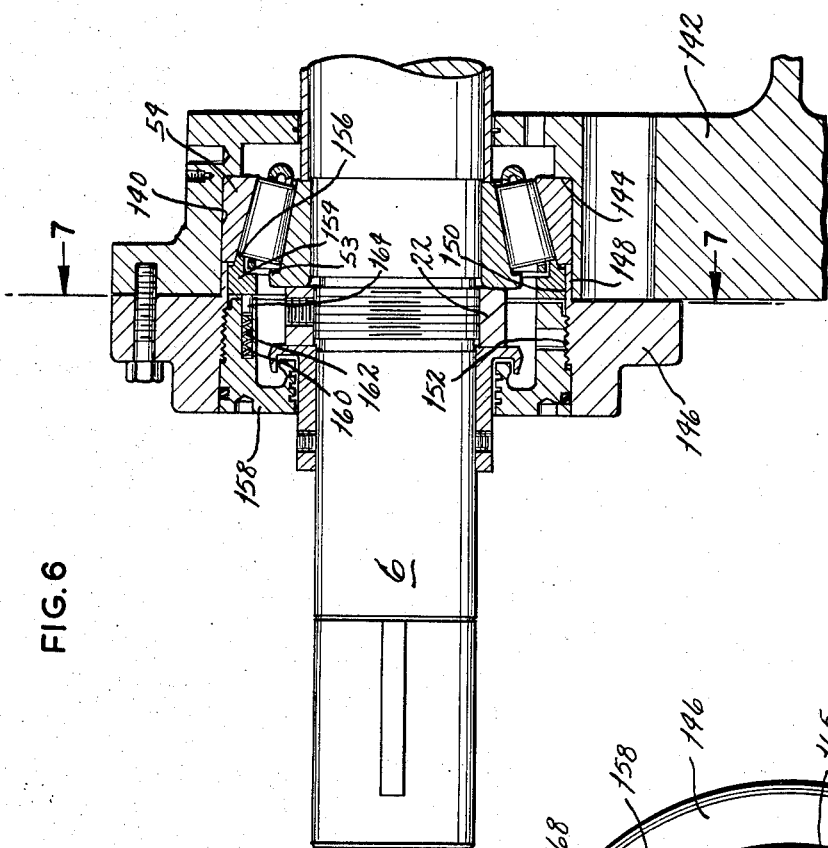
FIG. 6 is a sectional view of still another modified bearing construction.
Figure 7:
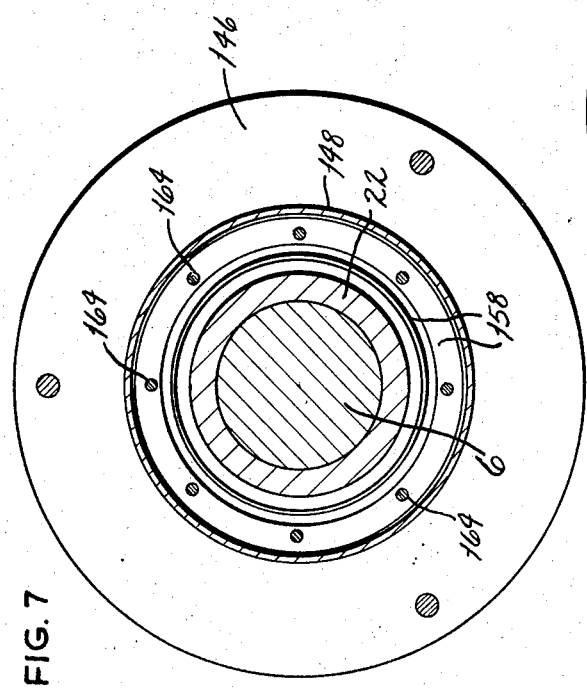
FIG. 7 is a sectional view taken along line 6—6 of FIG. 5.
Figure 8:
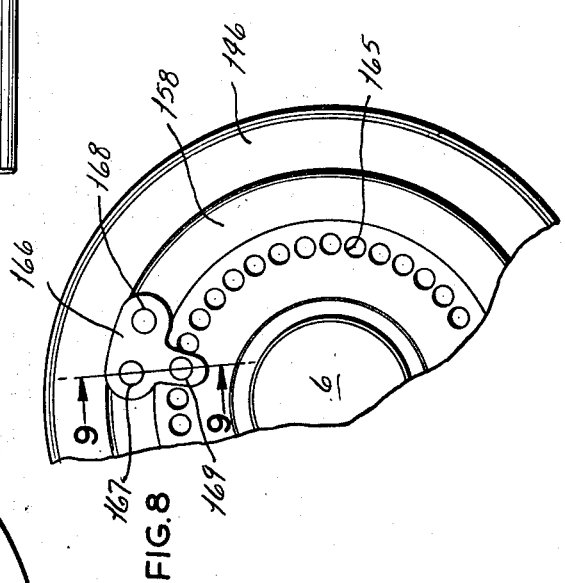
FIG. 8 is a fragmentary end view of the bearing construction illustrated in FIG. 6.
Figure 9:
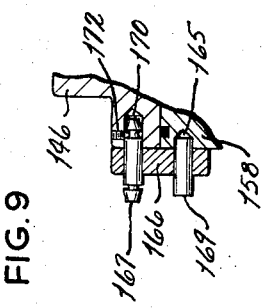
FIG. 9 is a sectional view taken along line 9—9 of FIG. 8.

The operation of the preload compensated bearing device was described above for the air-oil booster pressure system 90 (FIG. 4). The operation would be similar when using the self-relieving air pressure regulator 83 with the pressurized air-oil tank 84 (FIG. 3) or the pressure system using a hydraulic pump and a pressure reducing valve.

The set point of all the pressure regulated systems described herein are manually set to obtain the desired operational characteristics. It is, however, feasible that these operational characteristics (static stiffness, dynamic stiffness, resonant frequency, frictional torque, spindle accuracy and temperature) could be sensed by a transducer which, in turn, could be used to control the set point (spindle preload) to give the optimum or desired spindle performance characteristics.

MODIFICATIONS

Figure 5:
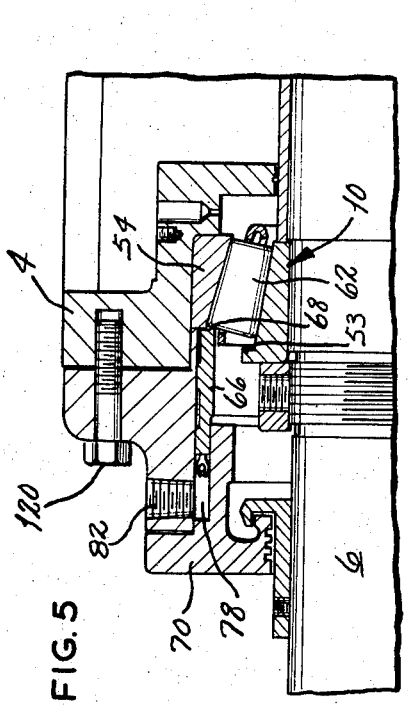
FIG. 5 is a fragmentary sectional view of a modified bearing construction.

In lieu of having the rib ring carrier 58 formed integral with the cup 54 of the bearing 10, it may be formed separate and bolted against the housing 4 by bolts 120 (FIG. 5). In such a construction, the cup 54 of the bearing 10 would possess the conventional configuration.

Also, it is possible to maintain a constant preload on the bearing 10 with mechanical springs instead of hydraulic loading. In such a construction (FIGS. 6–9) the cup 54 of the bearing 10 possesses the usual or conventional cup configuration and is set into a bore 140 formed in a housing 142. The housing 142 has a shoulder 144 at the end of the bore 140, and the back face of the cup 54 abuts that shoulder. Bolted against the housing 142 is a rib ring carrier 146 having an axially extending lip 148 which projects into the bore 140 of the housing 142 and abuts against the front face of the cup 54. Thus, the cup 54 is captured between the shoulder 144 and the lip 148. The rib ring carrier 146 is provided with a cylindrical bore 150 which opens toward the bearing cup 54, and immediately behind the cylindrical bore 150 it has a threaded bore 152.

Fitted into the cylindrical bore 150 is a rib ring 154 having a reduced annular rib 156 which projects beyond the large diameter end cup raceway 56 and bears against the large diameter ends of the tapered rollers 62. The bore 150 is somewhat longer than the rib ring 154, and accordingly the rib ring 154 is free to shift axially within the bore 150.

Positioned behind the rib ring 154 is a rib ring follower 158 having external threads which engage the threads of the threaded bore 152. Thus, the axial position of the follower 158 within the rib ring carrier 146 can be altered by rotating the follower 158. In addition to the external threads, the follower 158 is provided with a plurality of axially extending pockets 160 which are equally spaced and open forwardly toward the rib ring 154. Each pocket 160 contains a coil spring 162 and a pin 164 (FIGS. 6 and 7), and the pin 164 is urged outwardly into engagement with rib ring 154 by the spring 162. On its opposite side the follower 158 has outwardly opening sockets 165 arranged in a circle concentric with the center thereof.

The rib ring follower 158 at its opposite or outwardly presented end has an angle swivel plate 166 (FIGS. 8 and 9) which contains three protruding pins 167, 168 and 169 from each end. Two of these pins normally engage with pin holes 170 in the rib ring carrier 146. One of the pin holes 170 in the rib ring carrier 146 is provided with a Vlier ball plunger 172 (FIG. 9) and the protruding pins 167 and 168 of the swivel plate are grooved to coincide with the Vlier ball plunger 172 to lock the angle swivel plate 166 with the rib ring carrier 146. When the angle swivel plate 166 is engaged with the rib ring carrier 146, the third pin 169 of the angle swivel plate fits in any one of the sockets 165 in the follower ring 158 to hold the follower 158 in a fixed position. The swivel plate 166 may be disengaged from the rib ring carrier 146 by withdrawing the pins 167 thereof from the pin holes 170. This permits rotation of the follower 158 relative to the carrier 146, which in turn changes the axial position of the follower 158 within the carrier 146 and alters the force exerted by the springs 162 on the rib ring 154. Consequently, the preload in the bearing 10 is varied by rotating the rib ring follower 158, and this rotation may be made while the spindle 6 is rotating, but remains constant for a particular setting. The swivel plate 166 will engage and lock with the carrier 146 at any one of numerous angular positions so that preload may be adjusted with considerable precision.

The invention is intended to cover all changes and modifications of the example of the invention herein chosen for purposes of the disclosure which do not constitute departures from the spirit and scope of the invention.

What is claimed is:

1. A bearing construction for supporting a shaft within a housing, said bearing construction comprising: a cone encircling the shaft and having an outwardly presented tapered raceway; a cup in the housing and having an inwardly presented tapered raceway positioned opposite to the cone raceway; a plurality of tapered rollers positioned between the cup and cone and engaged with the raceways thereof, whereby the rollers will roll along the raceways as the cone and cup rotate relative to each other; a carrier supported by the housing adjacent to the large diameter ends of the raceways; a ring carried by the carrier at the ends of the rollers for axially positioning the rollers between the cup and the cone, the ring being shiftable in an axial direction relative to the carrier and the cup; and ring positioning means exerting an axially directed force on the ring for urging the ring toward and maintaining it in engagement with the rollers, said means being adjustable while the shaft rotates relative to the housing to selectively vary the magnitude of the force exerted on the ring, but maintaining a substantially constant force on the ring for any selected adjustment.

2. A bearing construction according to claim 1 wherein the ring has an annular rib at its one end, the rib engaging the rollers adjacent to the large diameter end of the cup raceway.

3. A bearing construction according to claim 1 wherein the ring positioning means comprises means defining a cavity which receives the end of the ring opposite from the rollers, and fluid supply means for supplying pressurized fluid to the cavity and for maintaining the pressure of the fluid substantially constant for any selected adjustment.

4. A bearing construtcion according to claim 3 wherein the cavity is annular and encircles the shaft, 5. A bearing construction according to claim 4 wherein the means defining the cavity comprises a cylindrical inwardly presented surface at the end of the carrier located remote from the cup, and a closure mounted on the carrier and extending into the carrier, the inwardly extending portion of the closure having an outwardly presented cylindrical surface spaced from the inwardly presented cylindrical surface of the carrier and forming the annular cavity therewith.

6. A bearing construction according to claim 3 wherein the fluid supply means comprises a reservoir of hydraulic fluid connected with the cavity for supplying hydraulic fluid thereto; a source of compressed gas, a booster connected with the cavity and source of compressed gas for converting the compressed gas into a force which pressurizes the hydraulic fluid in the cavity, a transmitter for sensing the pressure of the hydraulic fluid and for converting that pressure to a signal, and a pressure controller for comparing the signal with a predetermined set point pressure set into the controller and for varying the gas pressure such that it causes the hydraulic pressure to revert toward the predetermined set point pressure should any deviation from the set point occur.

7. A bearing construction according to claim 1 wherein the ring positioning means comprises a follower mounted on the carrier and shiftable relative thereto in the axial direction, springs carried by the follower and exerting the axial force on the rib ring whereby the magnitude of the force exerted on the ring is dependent on the axial position of the follower.

8. A bearing construction according to claim 7 wherein the follower is annular and has a plurality of axially extending pockets opening toward the rib ring; and wherein the pockets contain the springs.

9. A bearing construction according to claim 8 wherein the follower is threaded into the carrier, whereby its axial position is changed by rotating it relative to the carrier.

10. A bearing construction according to claim 7 wherein the positioning means comprises means for manually rotating the follower and for locking it in a selected angular position.

11. A method of assembling the bearing of claim 1 comprising: positioning the cup in a fixed position within the housing, holding the tapered rollers within the cup, positioning the tapered rollers against a yieldable force such that the apices of the rollers and the apex of the cup raceway intersect at the axis of rotation for the bearing, advancing the cone axially over shaft to bring its raceway into contact with the rollers, and advancing the cone still further to cause the rollers to move outwardly against the yieldable force.

12. A method according to claim 11 wherein the further advance is effected by turning a nut which is engaged with the shaft and determines the position of the cone.

13. A method according to claim 11 wherein the rollers are initially positioned with the ring of the bearing.

References Cited

UNITED STATES PATENTS 1,512,807   10/1924   Letter _____ 308—207 A

MILTON KAUFMAN, Primary Examiner

F. SUSKO, Assistant Examiner